(12) United States Patent
Spirig et al.

(10) Patent No.: US 12,038,034 B2
(45) Date of Patent: Jul. 16, 2024

(54) SELF-DRILLING, ANTI-BURR, THREADED FASTENER

(71) Applicant: SFS Group International AG, Heerbrugg/ St. Gallen (CH)

(72) Inventors: Sven Spirig, Sinking Spring, PA (US); Kevin Reinheimer, Exeter, PA (US); Erich Schanzenbach, Hellertown, PA (US)

(73) Assignee: SFS Group International AG, Heerbrugg (CH)

( * ) Notice: Subject to any disclaimer, the term of this patent is extended or adjusted under 35 U.S.C. 154(b) by 316 days.

(21) Appl. No.: 17/523,088

(22) Filed: Nov. 10, 2021

(65) Prior Publication Data
US 2022/0145922 A1    May 12, 2022

Related U.S. Application Data

(60) Provisional application No. 63/112,836, filed on Nov. 12, 2020.

(51) Int. Cl.
*F16B 25/00* (2006.01)
*F16B 25/10* (2006.01)

(52) U.S. Cl.
CPC ........ *F16B 25/0084* (2013.01); *F16B 25/103* (2013.01); *F16B 25/00* (2013.01)

(58) Field of Classification Search
CPC .. F16B 25/00; F16B 25/0057; F16B 25/0068; F16B 25/0084; F16B 25/103; F16B 33/02; F16B 35/041

USPC ............ 411/386, 387.1, 387.3, 387.4, 387.5, 411/387.8, 411, 412, 424, 426
See application file for complete search history.

(56) References Cited

U.S. PATENT DOCUMENTS

| | | | | |
|---|---|---|---|---|
| 5,827,030 A * | 10/1998 | Dicke | ................. | F16B 25/0084 411/386 |
| 7,156,600 B2 * | 1/2007 | Panasik | .................... | B21H 3/02 411/416 |
| 8,740,531 B2 * | 6/2014 | Su | ......................... | F16B 25/103 411/387.1 |
| 8,931,163 B2 * | 1/2015 | Kochheiser | ......... | F16B 25/0021 411/413 |
| 8,944,734 B2 * | 2/2015 | Su | ....................... | F16B 25/0063 411/386 |
| 2013/0039720 A1 * | 2/2013 | Shih | .................... | F16B 25/0047 411/387.4 |
| 2014/0294534 A1 * | 10/2014 | Park | .................... | F16B 25/0057 411/387.1 |
| 2015/0010374 A1 * | 1/2015 | Park | .................... | F16B 25/0063 411/387.1 |
| 2015/0322990 A1 * | 11/2015 | Langewiesche | .... | F16B 25/0078 411/387.1 |

(Continued)

Primary Examiner — Roberta S Delisle
(74) Attorney, Agent, or Firm — Volpe Koenig

(57) ABSTRACT

A self-drilling, anti-burr, threaded fastener is provided having at least two different thread portions. The first thread portion extends along the tip and the second thread portion extends along the tapered portion adjacent to the tip. A third thread portion can be provided between the first and second thread portions that includes a plurality of axial gaps that extend to the thread root to remove burrs. Alternatively, knurling is provided in an area where the first and second thread portions meet, and the knurling acts to remove burrs.

17 Claims, 2 Drawing Sheets

(56) References Cited

U.S. PATENT DOCUMENTS

2017/0241463 A1* 8/2017 Shih .................... F16B 25/0084
2017/0343029 A1* 11/2017 Hsu ..................... F16B 25/0052

* cited by examiner

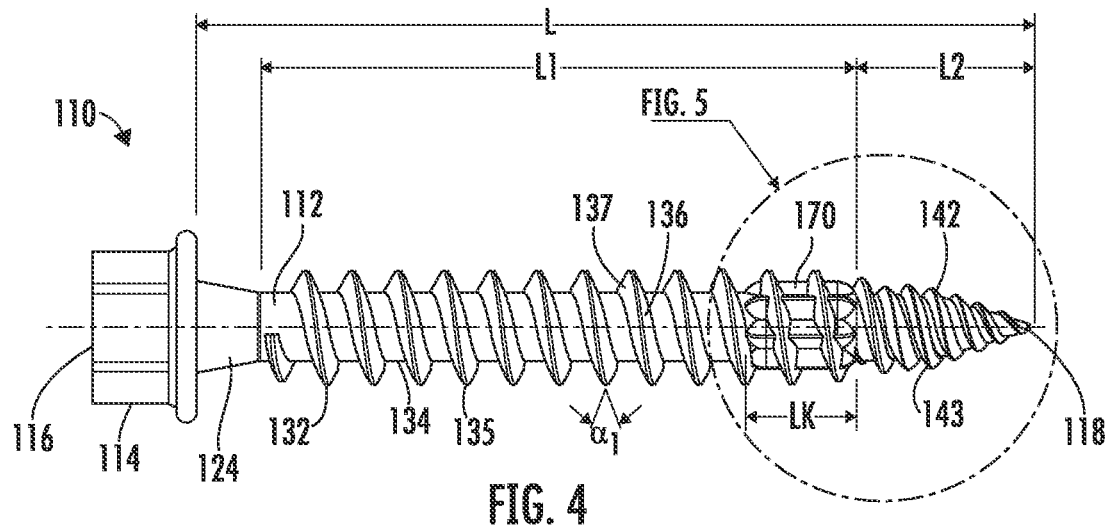
FIG. 4
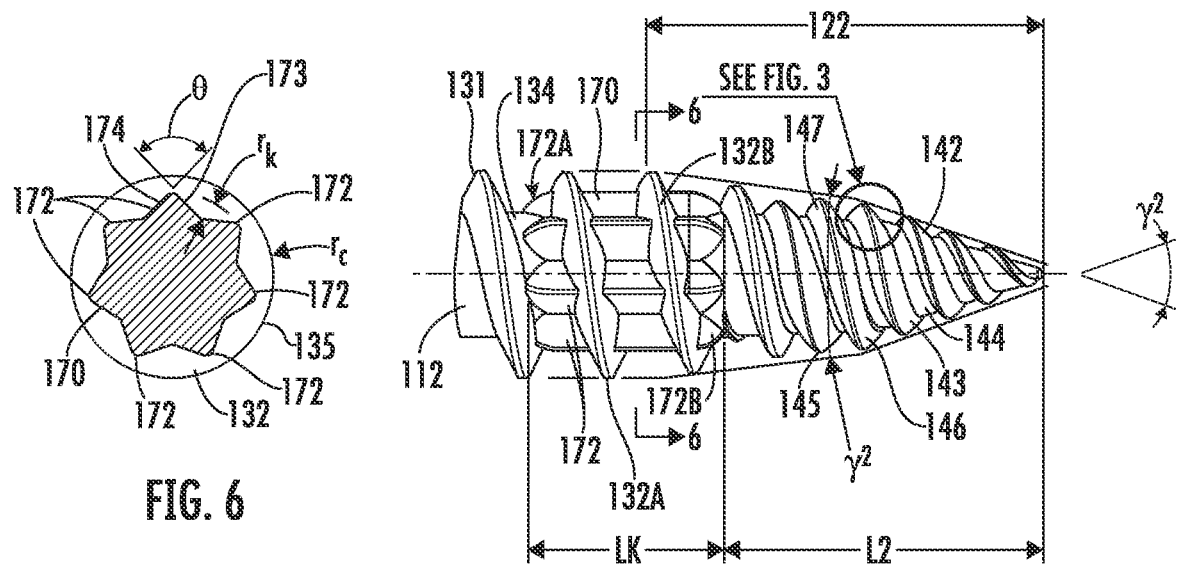
FIG. 6
FIG. 5

SELF-DRILLING, ANTI-BURR, THREADED FASTENER

TECHNICAL FIELD

The invention relates to a threaded fastener, and more particularly to a self-drilling, threaded fastener that reduces or eliminates burrs.

BACKGROUND

Fasteners, particularly screw-type fasteners drive through and/or into two objects, securing them to one another.

In the construction industry, painted or coated metal roofing, siding, and trim materials can be attached to various wooden substrates using various self-drilling screws. The sheet material is typically 20-24 gauge steel, but can be other materials, such as aluminum. The screws typically include a sealing washer that compresses under the head of the screw when seated against the sheet material. The function of the sealing washer is to keep moisture from penetrating under the head of the screw and down the threads. The washer can also provide a larger bearing surface that increases the amount of pullover force required for the panel to be pulled over the screw head.

One problem associated with these types of screws is that the self-drilling point causes a burr as it penetrates the sheet metal. This can cause various problems due to the burr extending beyond the sealing washer after the screw is installed, resulting in the burr rusting when exposed to the weather which can stain the steel panel. Another problem is that the burr can damage the rubber sealing washer during installation, resulting in leaks in the roof panel or siding.

It would be desirable to provide a self-drilling, anti-burr screw that addresses the issues noted above.

SUMMARY

A self-drilling, anti-burr, threaded fastener is provided in order to address one or more of the drawbacks noted above. This fastener includes a shaft, a head located at a first end of the shaft, and a tip point located at an opposite end of the shaft. A thread integrally extends from the shaft and extends along a portion of a length thereof, with the thread including a first thread portion, a second thread portion, and a third thread portion. The first thread portion is located nearest to the head and includes a first helical thread with a first root and a first crest, a first leading flank and a first trailing flank, and the first leading flank and the first trailing flank have angles that are approximately equal. The second thread portion extends along a portion of the shaft to the tip point and includes second helical thread with a second root and a second crest defined along the tapered portion that extends to the tip point, a second leading flank and a second trailing flank. A thread angle defined between the second leading and trailing flanks is between 86° and 88°, and the second leading flank has an angle of 55° to 60° relative to a normal extending from the shaft. The second helical thread is preferably a double lead thread. The third thread portion extends between the first thread portion and the second thread portion and includes a third helical thread with a third root and a third crest, a third leading flank and a third trailing flank. The third leading flank has an angle of 5°-25° to a normal extending from the shaft to the crest, the third trailing flank has an angle of 35°-55° to a normal extending from the shaft to the crest, and plurality of gaps extend through the third helical thread from the crest to the root. The tapered portion of the shaft has a taper angle of 20° to 30° at the tip point.

In one arrangement, there are at least 5 radially equally spaced gaps through at least two windings of the third helical thread. These gaps each extend circumferentially at least 25° in order to form burr removal surfaces. The third thread portion preferably has an axial length of between 10% and 25% of the first thread portion in order to provide a sufficient area for burr removal for burrs formed during self-piercing.

In another aspect, a tapered shaft portion extends adjacent to the head. This is adapted to provide enhanced sealing when a sealing washer is provided.

A further embodiment of a self-drilling, anti-burr, threaded fastener is provided having a shaft, a head located at a first end of the shaft, and a tapered point located at an opposite end of the shaft. A thread integrally extends from the shaft and extends along a portion of a length thereof. The thread includes a first thread portion and a second thread portion. The first thread portion is located nearest to the head and includes a first helical thread with a first root and a first crest and extends along a generally constant diameter portion of the shaft. The second thread portion extends along a portion of the shaft from the first thread portion to the tip point and includes a second helical thread with a second root and a second crest defined along a taper that extends to the tapered point, a second leading flank and a second trailing flank. In order to remove or reduce burrs, knurling is formed on the shaft in a region where the first thread portion and the second thread portion meet. The knurling extends at least along a part of the first helical thread and has a radial height that is smaller than a radial height of the first crest.

In one arrangement, the tapered portion of the shaft has a taper angle of 20° to 30° at the tip point. It is also preferred here that the tapered portion of the shaft has a second tapered portion with a second taper angle of 15° to 20° in a second taper region adjacent to the first thread portion.

In one arrangement, the radial height of the knurling is between 50% and 90% of the radial height of the first crest. Further, the knurling includes at least 5 axially extending projections, and more preferably 7 axially extending projections. Additionally, the axially extending projections intersect at least 2 windings of the first helical thread.

In one arrangement, the axially extending projections each include a leading face and a trailing face, and an angle between the leading face and the trailing face is between 75° and 105°. Additionally, it is preferred that the ends of the axially extending projections taper toward the shaft, either with a curved or straight taper.

In one arrangement, the second helical thread is a double lead thread. Preferably, a thread angle of the second helical thread defined between the second leading flank and the second trailing flank is between 86° and 88°, and the second leading flank has an angle of 55° to 60° relative to a normal extending from the shaft.

In one arrangement, the thread and the knurling are cold formed on the shaft.

In one arrangement, a tapered shaft portion extends adjacent to the head. This assists in sealing if a sealing washer is placed on the shaft under the head.

For all of the arrangements contemplated, a tool engagement surface or recess is located on or in the head, and can be, for example, a hex shape, a cross-slot, a Phillips® or Torx® drive, or any other suitable tool engagement provision.

BRIEF DESCRIPTION OF THE DRAWING(S)

The foregoing summary as well as the following detailed description will be best understood when read in conjunction with the appended drawings. In the drawings:

FIG. 4 is a side view of a second embodiment of a self-drilling, anti-burr, threaded fastener.

FIG. 5 is an enlarged detail taken from the indicated area in FIG. 4.

FIG. 6 is a cross-sectional view taken along line 6-6 in FIG. 5.

DETAILED DESCRIPTION OF THE PREFERRED EMBODIMENTS

Figure 1:
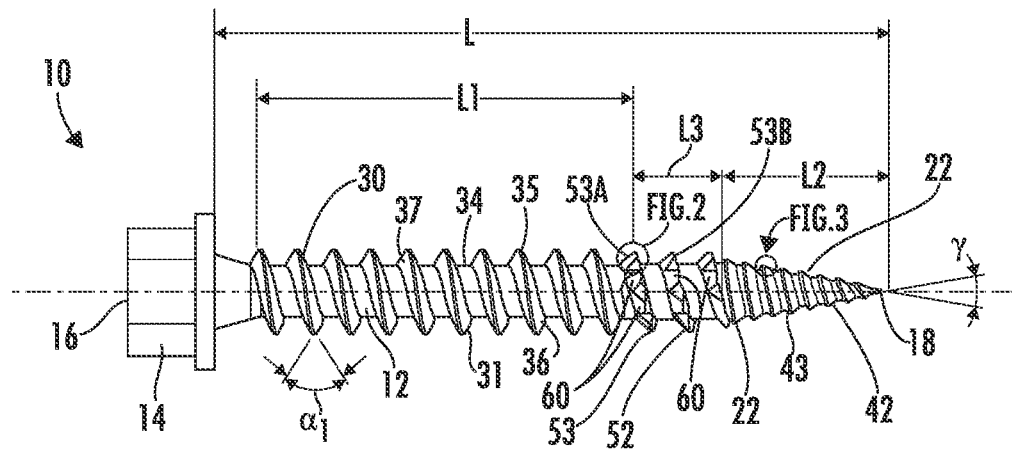
FIG. 1 is side view of a first embodiment of a self-drilling, anti-burr, threaded fastener.

Certain terminology is used in the following description for convenience only and is not limiting. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import. The terms "generally" and "approximately" include a deviation of +/−10% of the indicated value, or the industry accepted norm, whichever is greater. A "winding" of a thread is one full revolution, i.e. 360°. A "normal" is a reference line or plane that extends generally perpendicular to the referenced shaft or axis.

Figure 2:
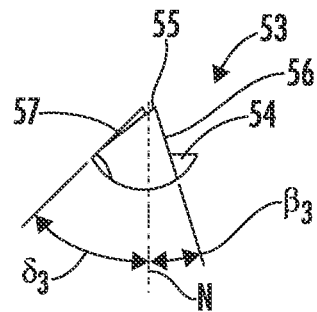
FIG. 2 is an enlarged detail taken from the indicated area in FIG. 1.
Figure 3:
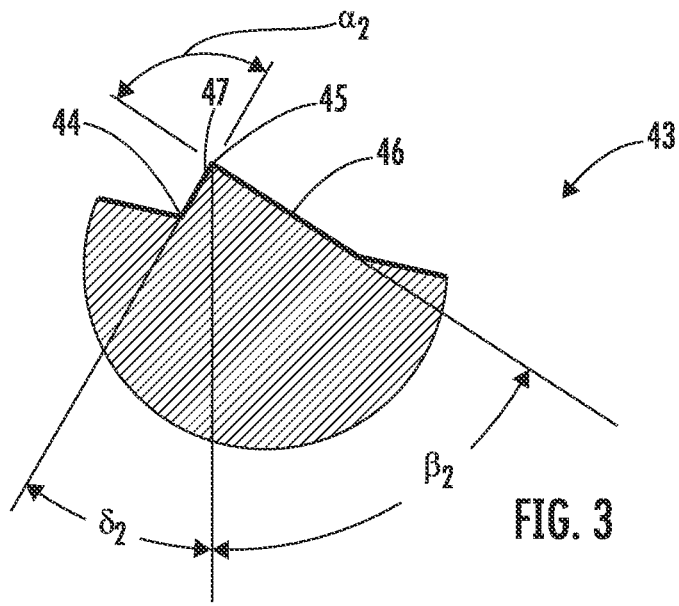
FIG. 3 is an enlarged detail taken from the indicated area in FIG. 1.

Referring to FIGS. 1-3, a first embodiment of a fastener 10 is shown. The fastener 10 is a self-drilling, anti-burr, threaded fastener that can be used for connecting panel or sheet material to a wooden substrate and is particularly useful in attaching metal roofing and siding to wooden understructure.

The fastener 10 includes a shaft 12, a head 14, located at a first end 16 of the shaft 12, and a tip point 18 located on an opposite end of the shaft 12 from the head 14. The shaft 12 can further include a tapered shaft portion 24 extending adjacent to the head 14.

A thread 30 extends integrally from the shaft 12 and extends along a portion of a length L of the shaft 12. The thread 30 includes a first thread portion 31, a second thread portion 42, and a third thread portion 52. The first thread portion 31 is located nearest to the head 14 and extends a length L1 of the shaft 12 as shown in FIG. 1. This first thread portion 31 includes a first helical thread 32 having a first root 34 and a first crest 35. The first thread portion 31 also includes a first leading flank 36 and a first trailing flank 37. Here, the first leading flank 36 and the first trailing flank 37 preferably have angles that are approximately equal relative to a normal to the shaft, and in a preferred embodiment define an angle $\alpha_1$ of 40° to 80° relative to one another, and more preferably between 50° and 70°.

The second thread portion 42 extends, preferably along a tapered portion 22 of the shaft, which has a length L2 as indicated in FIG. 1, to the tip point 18 and includes a second helical thread 43 with a second root 44, a second crest 45 defined along the tapered portion 22 that extends to the tip point 18, as well as a second leading flank 46 and a second trailing flank 47. A thread angle $\delta_2$ defined between the second leading and trailing flanks 46, 47 as preferably between 85° and 90°, and in one embodiment is 87°, as shown in FIG. 3. Further, in order to remove any existing burs formed during self-piercing, the second leading flank 46 has an angle $ß_2$ of 55° to 60° relative to a normal N extending from the shaft 12, and in one embodiment is 57°. The second trailing flank 47 has an angle $\delta_2$ of 25°-35° relative to a normal N extending from the shaft 12 to the second crest 45, and in one embodiment is 30°. In a preferred arrangement, the second helical thread 43 is a double lead thread.

The third thread portion 52 extends between the first thread portion 31 and the second thread portion 42 and includes a third helical thread 53 which has a third root 54 and a third crest 55 as well as a third leading flank 56 and a third trailing flank 57. The third leading flank 56 has an angle $ß_3$ of 5°-25° to a normal N extending from the shaft 12 to the third crest 55. The third trailing flank 57 has an angle $\delta_3$ of 35°-55° relative to a normal N extending from the shaft 12 to the third crest 55.

In order to remove burrs, a plurality of gaps 60 extend through the third helical thread 53 from the third crest 55 to the third root 54. Preferably, the gaps 60 extend circumferentially at least 25°, and more preferably at least 40°. In a preferred embodiment, there are at least five equally spaced gaps 60 through at least two windings, 53A, 53B of the third helical thread 53. In order to provide a sufficient burr removal length, preferably the length L3 of the third thread portion 52 is between 10% and 25% of the length L1 of the first thread portion 31.

In one preferred embodiment there are at least seven of the circumferentially spaced apart gaps 60 in each winding 53A, 53B of the third helical thread 53.

Referring now to FIGS. 4-6, a second embodiment of a fastener 110 is shown. The fastener 110 includes a shaft 112, head 114 located at a first end 116 of the shaft 112, and a tip point 118 located at an opposite end of the shaft 112. Preferably, a tapered shaft portion 124 extends adjacent to the head 114 and can be used to enhance sealing if a sealing washer is provided.

A thread 130 extends integrally from the shaft 112 and extends along a portion of a length L thereof. The thread 130 includes a first thread portion 131 having a length L1 and a second thread portion 142 having a length L2. The first thread portion 131 is located nearest to the head 114 and includes a first helical thread 132 that has a first root 134 and a first crest 135, as well as a first leading flank 136 and a first trailing flank 137. This first helical thread 132 extends along a generally constant diameter portion of the shaft 112. Preferably, an angle $\alpha_1$ between the first leading flank 136 and the first trailing flank 137 is in a range of 40°-80°, and more preferably, in a range of 50°-70°.

The second thread portion 142 extends along a tapered portion 122 of the shaft 112, which has a length L2, from the first thread portion 131 to the tip point 118 and includes a second helical thread 143 with a second root 144 and a second crest 145 defined along the tapered portion 122. The second helical thread 143 further includes a second leading flank 146 and a second trailing flank 147. Preferably, the second leading flank 146 and the second trailing flank 147 are arranged in a similar manner to the second leading flank 46 and the second trailing flank 47 discussed above in connection with the first embodiment of the fastener 10 and illustrated in FIG. 3. Here, the angle $\alpha_2$ is similarly between 85° and 90°, and in the illustrated embodiment is 87° (as shown in FIG. 3), and the second leading flank 146 has an angle ß$_2$ of 55° to 60° (as shown in FIG. 3) relative to a normal N extending from the shaft 112.

Additionally, in order to enhance the self-drilling functionality of the fastener 110, the tapered portion 122 of the shaft 112 has a taper angle γ of 20° to 30° at the tip point 118. More preferably, as shown in detail in FIG. 5, the tapered portion 122 of the shaft 112 has a first and second tapered portions, with the first tapered portion being adjacent to the tip 118 and the second tapered portion being adjacent to the first thread portion 131. The second tapered portion has a second taper angle γ$_2$ of 15° to 20°, In order to remove any burrs that may be formed during the self-drilling installation of the fastener 110, knurling 170 is formed on the shaft 112 in a region where the first thread portion 131 and the second thread portion 142 meet. The knurling 170 extends at least along a part of the first helical thread 132 and has a radial height r$_k$ that is smaller than a radial height r$_c$ of the first crest 135.

As shown in detail in FIGS. 5 and 6, the radial height r$_k$ of the knurling 170 is more preferably between 50% and 90% of the radial height r$_c$ of the first crest 135. In the preferred embodiment, the knurling 170 includes at least 5 axially extending projections 172, and more preferably includes seven of the axially extending projections 172. These axially extending projections 172 intersect at least two of the windings 132A, 132B of the first helical thread 132. The ends 172A, 172B of these axially extending projections preferably taper toward the shaft 112 in an area of the first root 134 between the thread windings of the first helical thread 132. As shown in FIG. 6, the axially extending projections 172 each include a leading face 173 and a trailing face 174 and an angle θ, shown in FIG. 6, between the leading face 173 and the trailing face 174 is between 75° and 105°.

Preferably, the thread 130 and the knurling 170 are cold formed on the shaft 112 during formation of the fastener 110.

Using some or all of the above features results in a fastener 10, 110 with reduced tendency to produce burrs during installation. The fasteners 10, 110 may be used in connection with a known sealing washer, not shown, in order to provide a tight seal against the panels being installed and increase pull through strength.

The sealing washer may be a ½ inch OD G90 galvanized washer, which is vulcanized to black non-conductive EPDM rubber, although other suitable washer configurations may be utilized.

The threaded fastener 10, 110 may be provided in a number of different sizes, including #8, #10, #12, and #14, although the threaded fastener 10, 110 may also be provided in other suitable sizes. The threaded fastener 10, 110 may be formed from carbon steel, stainless steel, or aluminum, although other suitable materials and combination of materials may be utilized.

Having thus described various embodiments of the present anti-burr fasteners in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A fastener comprising:
a shaft, a head located at a first end of the shaft, and a tip point located at an opposite end of the shaft;
a thread integrally extending from the shaft and extending along a portion of a length thereof, the thread including a first thread portion, a second thread portion, and a third thread portion;
the first thread portion located nearest to the head including a first helical thread with a first root and a first crest, a first leading flank and a first trailing flank, and the first leading flank and the first trailing flank have angles that are approximately equal;
the second thread portion extends along a portion of the shaft to the tip point and includes a second thread with a second root and a second crest defined along the tapered portion that extends to the tip point, a second leading flank and a second trailing flank, a thread angle defined between the second leading and trailing flanks is between 86° and 88°, and the second leading flank has an angle of 55° to 60° relative to a normal extending from the shaft;
the third thread portion extends between the first thread portion and the second thread portion and includes a third helical thread with a third root and a third crest, a third leading flank and a third trailing flank, the third leading flank has an angle of 5°-25° to a normal extending from the shaft to the third crest, the third trailing flank has an angle of 35°-55° to a normal extending from the shaft to the crest, and a plurality of gaps that extend through the third helical thread from the crest to the root; and
a tapered portion of the shaft has a taper angle of 20° to 30° at the tip point.

2. The fastener of claim 1, wherein there are at least 5 radially equally spaced gaps through at least two windings of the third helical thread.

3. The fastener of claim 2, wherein each of the gaps extends circumferentially at least 25°.

4. The fastener of claim 1, further comprising a tapered shaft portion extending adjacent to the head.

5. The fastener of claim 1, wherein the third thread portion has an axial length of between 10% and 25% of the first thread portion.

6. A fastener comprising:
a shaft, a head located at a first end of the shaft, and a tip point located at an opposite end of the shaft;
a thread integrally extending from the shaft and extending along a portion of a length thereof, the thread including a first thread portion and a second thread portion;
the first thread portion located nearest to the head including a first helical thread with a first root and a first crest and extends along a generally constant diameter portion of the shaft;
the second thread portion extends along a tapered portion of the shaft from the first thread portion to the tip point and includes a second helical thread with a second root and a second crest defined along the tapered portion that extends to the tip point, a second leading flank and a second trailing flank; and
knurling formed on the shaft in a region where the first thread portion and the second thread portion meet, the knurling defining axially extending projections that extend parallel to an axis of the shaft at least along a part of the first helical thread and having a radial height that is smaller than a radial height of the first crest.

7. The fastener of claim 6, wherein the tapered portion of the shaft has a taper angle of 20° to 30° at the tip point.

8. The fastener of claim 7, wherein the tapered portion of the shaft has a second tapered portion with a second taper angle of 15° to 20° in the second tapered portion adjacent to the first thread portion.

9. The fastener of claim 6, wherein the radial height of the knurling is between 50% and 90% of the radial height of the first crest.

10. The fastener of claim 6, wherein there are at least 5 of the axially extending projections.

11. The fastener of claim 10, wherein the axially extending projections intersect at least 2 windings of the first helical thread.

12. The fastener of claim 10, wherein the axially extending projections each include a leading face and a trailing face, and an angle between the leading face and the trailing face is between 75° and 105°.

13. The fastener of claim 10, wherein ends of the axially extending projections taper toward the shaft.

14. The fastener of claim 6, wherein the second helical thread is a double lead thread.

15. The fastener of claim 6, wherein a thread angle defined between the second leading flank and the second trailing flank is between 86° and 88°, and the second leading flank has an angle of 55° to 60° relative to a normal extending from the shaft.

16. The fastener of claim 6 wherein the thread and the knurling are cold formed on the shaft.

17. The fastener of claim 6, further comprising a tapered shaft portion extending adjacent to the head.

* * * * *